Patented Mar. 14, 1944

2,343,995

UNITED STATES PATENT OFFICE 2,343,995

DISAZO DYES DEVELOPED ON THE FIBER

Henry Charles Olpin and John Wright, Spondon, near Derby, England, assignors to Celanese Corporation of America, a corporation of Delaware No Drawing. Application July 9, 1940, Serial No. 344,605. In Great Britain August 8, 1939

2 Claims. (Cl. 8—48)

This invention is concerned with the colouring of textiles by processes involving the formation of azo dyes thereon. The invention is more particularly concerned with the colouring of cellulose ester or ether material by such processes.

The colouring of cellulose acetate and other cellulose ester or ether materials by coupling a diazo compound thereon with an amine coupling component is a valuable method, more particularly since, with suitably chosen components, it is possible to get a wide range of dark shades which have very good fastness properties, and, in addition, the very valuable property of being dischargeable with, for instance, reducing discharging agents, e. g. formaldehyde sulphoxylates. The production of such shades is most readily accomplished by using amino-azo compounds as the diazo components and N-substituted amines of the benzene series as coupling components.

In carrying out the colouring of cellulose ester or ether materials by this process it is very desirable that the coupling component should be capable of rapid coupling with the diazo compound. This is necessary in order that coupling may be completed before opportunity has been afforded for any substantial decomposition of the diazo compound on the material. Decomposition in this sense represents not only a loss of material but also may result in shades very different from those it is intended to produce. It is further a great advantage to employ coupling components which yield shades towards the blue end of the series yellow, orange, red, violet, blue and greenish blue. Such shades are particularly valuable since dischargeable colours towards the yellow end of the series are more common and their production on cellulose ester, or ether materials presents fewer difficulties to the dyer than do shades towards the blue end of the series.

It has now been found that the N-substitution products of aniline containing an ether group in the meta-position to the amino group but which are free from other nuclear substituents are very valuable as coupling components for the formation of azo dyes on cellulose ester and ether and other textile materials. They couple very readily and quickly with diazo compounds under coupling conditions such as it is convenient and expedient to employ when effecting coupling on a textile material. As compared with N-substitution products of aniline itself, products not containing the ether group in m-position to the amino group, they are greatly superior as regards ease of coupling with diazo compounds, and, moreover, yield shades displaced towards the greenish blue end of the colour series mentioned above.

According to the present invention, therefore, textile material is coloured by forming an azo dye thereon by coupling a diazo compound with an N-substituted aniline containing an ether group in the meta-position to the amino group but which is free from other nuclear substituents.

The ether group present in meta-position to the amino group of the coupling component can be, for instance, an alkoxy group, an aralkoxy group or an aryloxy group, and the alkyl, aryl or aralkyl radicle of this group may itself contain a substituent, for example a hydroxy group. Examples of such ether groups are methoxy, ethoxy, $\beta$-hydroxyethoxy, $\beta$-ethoxy-ethoxy, phenoxy and benzyloxy.

The amino group of the coupling component, as already indicated carries a substituent or substituents. These can be alkyl, aryl, aralkyl, or cyclo-alkyl groups (including substituted alkyl, aryl, aralkyl, or cyclo-alkyl groups). Again, instead of two separate substituents, a simple substituent may be united, at two points, to the nitrogen atom of the amino group so as to form, with the said nitrogen atom, a heterocyclic radicle, e. g. the piperidyl radicle, or the morpholine radicle.

Specific examples of coupling components for use in accordance with the invention are the N-diethyl-, N-dimethyl-, N-ethyl-N-$\beta$-hydroxyethyl, N-di($\beta$-hydroxyethyl)-, N-ethyl-N-$\beta\gamma$-dihydroxypropyl, N-cyclohexyl-, N-ethyl-N-cyclohexyl, and N-ethyl-N-benzyl- derivatives of m-anisidine and m-phenetidine, and the N-diethyl-derivatives of 3-amino-1-$\beta$-hydroxyethoxy-benzene, and 3-amino-1-benzyloxy-benzene.

It will be appreciated that the coupling components used acording to the invention are ethers of m-amino phenol of which the amino group carries at least one substituent.

Widely varying types of diazotisable amino compounds can be employed as diazo compounds for coupling with the above mentioned coupling components on textile materials. Particularly suitable for cellulose ester or ether materials, especially for the production thereon of dark shades such as navy blues, are azobenzenes, azo-$\alpha$-naphthalenes and benzene-azo-$\alpha$-naphthalenes containing one or two diazotisable amino groups in para positions to azo groups. Substituents may be present in addition to the diazotisable amino groups and the azo groups, for example alkyl groups, alkoxy groups, halogen atoms or nitro groups, the latter two types of substituents more particular in a nucleus which does not contain a diazotisable amino group. Sulphonic and carboxylic groups are preferably absent from the diazo components when producing dyes on cellulose esters or ethers.

A very valuable class of diazotisable amino compounds are the 4-nitro-4'-aminoazo-benzenes, and particularly those of the general formula

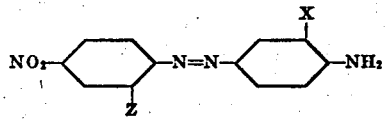

wherein K represents hydrogen, alkoxy, alkyl or halogen, Y represents alkyl, alkoxy or acidylamino, and Z represents hydrogen, alkyl, alkoxy or acidylamino. Those compounds in which Z is hydrogen are especially useful. Such amino-azo compounds can be prepared by coupling diazotised p-nitraniline or the appropriate derivative thereof with the appropriately substituted aniline as coupling component. For specific examples of amino-azo compounds suitable as diazo components, reference may be made to those referred to in U. S. Patent No. 2,196,984, and U. S. applications S. Nos. 310,176 and 310,177 filed December 20, 1939, for diazotising on textile materials and coupling with various amine coupling components. The amine coupling components containing an ether group in meta-position to the amine group can also be coupled on cellulose ester or ether materials with diazo compounds of amines which do not contain azo groups. Examples of such amines of which the diazo compounds can be used are the anilide of 4-amino-benzoic acid, mono-benzoyl-p-phenylene diamine, monacetyl benzidine, monacetyl-tolidine and monoacetyl dianisidine.

In the case of cotton or regenerated cellulose materials, diazotisable substantive dyes are suitable as diazo components for diazotising and coupling with the amine coupling component containing an ether group in meta-position to the amino group.

As regards the procedure to be followed in forming the dyes on cellulose ester or ether materials, it is preferred to incorporate the diazo component in the material and then to effect diazotisation and couple with the coupling component in a separate bath.

The diazo components can be applied to cellulose ester or ether materials in the form of aqueous dispersions. Bath methods may be employed, that is to say methods in which the materials are allowed to absorb the diazo component from an aqueous dispersion of the latter in which they are immersed. Again, mechanical impregnation methods may be used, the materials being impregnated with a quantity of liquid containing the requisite proportion of diazo component. To this end padding or printing methods may be utilised. The mechanical impregnated material may then be aged or steamed to cause the diazo component to enter the cellulose ester or ether material.

If a diazo component having substantive affinity for cellulose esters or ethers but substantially no substantive affinity for cellulose is applied to mixed materials containing both cellulose (e. g. cotton or regenerated cellulose) and a cellulose ester or ether, the latter alone takes up the diazo component, so that on diazotising and coupling with the coupling component the cellulose component of the material remains uncoloured. By sutably colouring the cellulose component of such mixed material with dyestuffs resisting the cellulose ester or ether component of the materials solid shades or two colour effects can readily be obtained according to the components and dyes selected. The dyestuff for the cellulose portion can be applied before or after the development of the azo dye on the cellulose ester or ether portion. If desired, however, it may be applied before development and either together with or separately from the diazo component applied to the cellulose ester or ether portions. If the dyestuff for the cellulose component is diazotisable it can be diazotised and developed with a suitable coupling component at any convenient stage of the operation. Further, if desired, the amine coupling component employed in accordance with the present invention for the formation of an azo-dye on the cellulose ester or ether component of the material may simultaneously be used to develop the diazotised dyestuff on the cellulose component of the mixed material.

The dyeings produced on cellulose ester or ether materials in accordance with the invention may be subsequently topped with other dyes and particularly with dyestuffs having direct affinity for the cellulose ester or ether. For example, a navy blue shade produced according to the invention may be topped with an orange dye or with both a red dye and a yellow dye in order to produce a very dark navy or black shade.

The invention is illustrated by the following examples:

*Example 1*

10 parts of a 10% aqueous paste of the aminoazo compound from diazotised 4-nitro-aniline and 2:5-dimethoxyaniline are applied to 100 parts of a cellulose acetate knitted fabric from a 30:1 bath by normal dispersion dyeing methods. The well rinsed goods are then entered into a cold 30:1 diazotising bath prepared with 5% sodium nitrite and 20% of concentrated hydrochloric acid on the weight of goods. After treating for half an hour the goods are washed off well and entered at 30% C. into a 30:1 bath of soft water containing 2% on the weight of goods of N-diethyl-m-anisidine dispersed with three times its weight of Turkey red oil, the temperature being then raised to 60° C. during half an hour and maintained thereat for half an hour. The goods are then soaped off well and dried, the shade thus obtained being a full reddish navy blue.

N-diethyl-m-phenetidine or 3-diethylamino-1-β-hydroxy-ethoxy-benzene can be used in place of the N-diethyl-m-anisidine with similar results.

*Example 2*

A knitted fabric consisting of cellulose acetate artificial silk and viscose artificial silk and containing approximately 66% and 34% of the respective fibers is dyed from a bath containing 10% of a 10% paste of aminoazobenzene on the weight of the cellulose acetate and 5% of Chlorazol Black BH on the weight of the viscose. Dyeing is carried out at 75-80° C. in a 30:1 bath for 1½ hours, addition of 30% Glauber's salt on weight of the goods being made to assist exhaustion of the direct cotton colour. The fabric is then rinsed and diazotised for half an hour at 10-20° C. in a 30:1 bath prepared with 5% sodium nitrite and 20% of concentrated hydrochloric acid on the weight of the material. After diazotising the fabric is rinsed and entered into a 30:1 bath containing 2% on the weight of the goods of N-di(β-hydroxy ethyl)-m-anisidine dispersed with three times its weight of Turkey red oil. The initial temperature of the coupling bath is 20° C., being raised to 60° C. in 15 minutes, and maintained thereat for three quarters of an hour. The pattern is then washed off and soaped in a 0.5 gram per litre soap solution at 60° C., for twenty minutes in a 30:1 bath. The cellulose acetate is dyed a full bluish red and the viscose navy blue.

If instead of aminoazobenzene, monobenzoyl-p-phenylene diamine is used a golden yellow is obtained on the cellulose acetate, giving a golden yellow and navy blue cross-dyed effect.

Having described our invention, what we desire to secure by Letters Patent is:

1. Process for the coloration of cellulose acetate textile material which comprises diazotizing thereon 4-nitro-4'-amino-2':5'-dimethoxy-azo benzene and coupling the resulting diazo compound on the material with N-di-ethyl-m-anisidine.

2. Textile materials of cellulose acetate colored with an azo dye obtained by diazotizing thereon 4-nitro-4'-amino-2':5'-dimethoxy-azo benzene and coupling the resulting diazo compound on the material with N-di-ethyl-m-anisidine.

HENRY CHARLES OLPIN.
JOHN WRIGHT.